Jan. 18, 1927.

V. P. CLEAR 1,614,776

LIQUID-LEVEL INDICATOR

Filed July 2, 1924

Victor P. Clear
INVENTOR

BY John P. Nixonov
ATTORNEY

Patented Jan. 18, 1927.

1,614,776

UNITED STATES PATENT OFFICE.

VICTOR P. CLEAR, OF NEW YORK, N. Y.

LIQUID-LEVEL INDICATOR.

Application filed July 2, 1924. Serial No. 723,746.

My invention relates to liquid level indicators and has a particular reference to indicators adapted to indicate the height of the liquid in a tank at some distant point.

The object of my invention is to provide an indicator which could be placed at any distance and in any position in relation to the tank, which would register accurately the height of the liquid in the tank, and which would not be affected by temperature and pressure variations.

In my indicator I employ a float in the tank and connect this float with a flexible air tight chamber. The space inside of this chamber is connected by means of suitable pipes with an indicator adapted to register variations in the pressure in these pipes. I arrange the connections between the float and the chamber so that the changes in the pressure in this chamber are proportional to the changes in the height of the liquid in the tank. Therefore by properly calibrating the scale of my instrument I can use it to indicate the amount of liquid in the tank.

My invention is more fully described in the accompanying specification and drawings in which—

Figure 1:
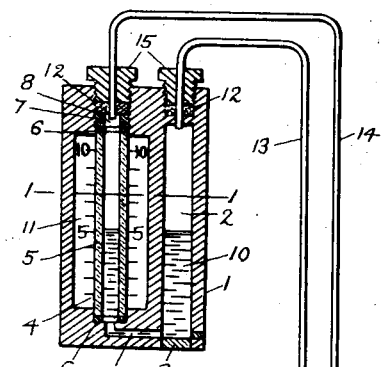
Figure 2:
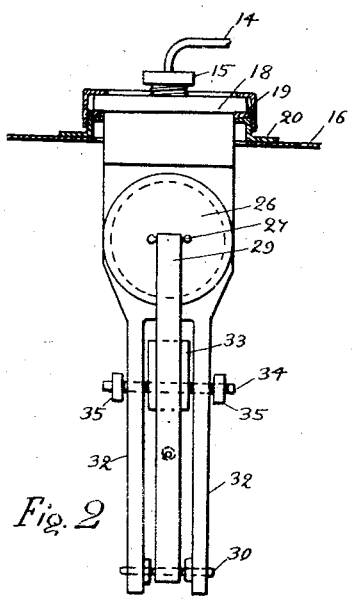
Figure 3:
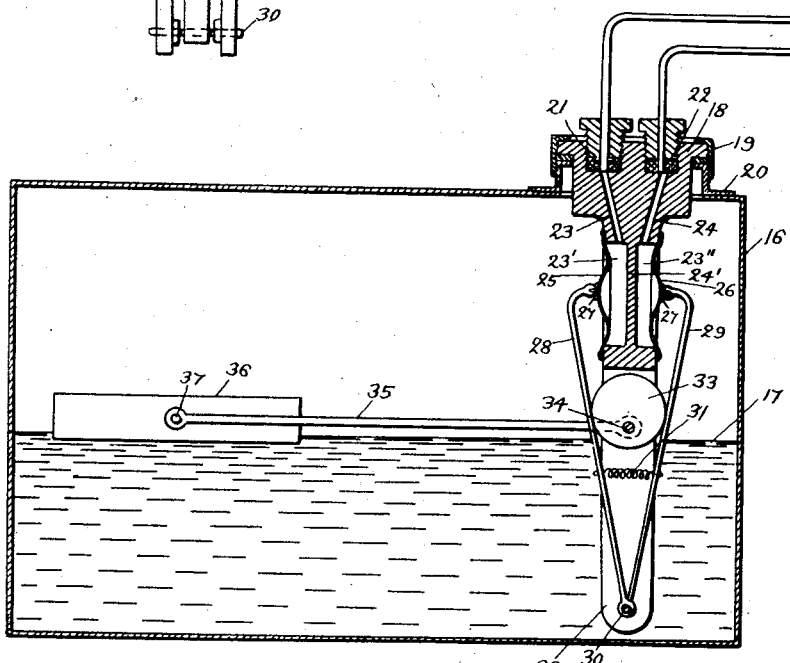
Figure 3:
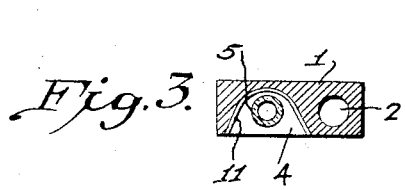

Fig. 1 is an elevation partly in section of my indicator, showing also a tank and the tank fixture, Fig. 2 is a side view of the tank fixture, and Fig. 3 is a sectional view of the indicator, the section being taken on the line 1—1 (Fig. 1).

My indicator consists of a block 1 which may be of metal or some other suitable material (Figs. 1 and 3). On one side the block has a longitudinal cylindrical aperture 2 closed at the bottom with a plug 3. At the other side there is a recess 4 into which a glass tube 5 is fitted, being clamped between elastic washers 6 by means of a nut 7 with a central aperture 8. The lower portions of the glass tube 5 and of the cylindrical chamber 2 are connected by means of a passage 9 thereby forming a U-tube. An indicating liquid 10 is placed in this U-tube. A scale 11 is placed in the recess 4, partly surrounding the glass tube 5.

The legs 2 and 5 of this U-tube are provided with packing bushings 12 on top for connecting pipes 13 and 14, the bushings being clamped around the pipe ends by means of gland nuts 15 thereby effecting air tight connections for the pipes 13 and 14.

These pipes extend to a tank 16 with a liquid 17. A tank fixture 18 is attached to the top of the tank by means of a clamping nut 19 fitting over a base 20. This fixture is provided with packing glands 21 and 22 for the ends of the pipes 13 and 14. Passages 23 and 24 connect these pipes with air tight chambers 23' separated by a wall 24' and closed on the opposite sides with flexible diaphragms 25 and 26. The centers of these diaphragms are provided with reenforced portions 27 to which are attached the ends of the operating rods 28 and 29. These rods or levers are hinged together at the point 30 and are drawn together by means of a spring 31. The hinge or pivot 30 is attached to the lower extension 32 of the fixture 18.

A cam 33 is fastened to a small shaft 34 between the legs 32 of the fixture 18. The ends of the shaft 34 are rigidly attached to links 35 connected to a cork float 36 by means of pins 37.

The operation of this device is as follows. For each position of the float 36 the cam 33 takes a corresponding position, operating the diaphragms through rods 28 and 29 in such way as to move one diaphragm in and the other out of their respective chambers, thereby changing their air contents and displacing the indicating liquid in the indicator. For instance, if the amount of liquid in the tank is increased, then the float 36 rises, the cam 33 pushes the arm 29, thereby expanding the chamber 23" and drawing the air from the leg 5 of the U-tube. The other arm 28, at the same time, will be drawn in by the action of spring 31, thereby pushing the diaphragm 25 and forcing the air from the chamber 23' into the leg 2 of the indicator U-tube. The indicating liquid, accordingly, will be displaced from the leg 2 into the leg 5. The amount of such displacement depends only on the shape of the cam 33 and on the dimensional proportions between the arms 28 and 29 and links 35. The indicating liquid forms a movable separator between the air volumes in the pipes 13 and 14, and it is evident that the form of this indicator may be changed considerably without deviating from the main principle of my invention.

With two pipes and two chambers, the instrument is not affected by temperature changes, as any change in pressure in one chamber and pipe is accompanied by the corresponding change in the other pipe. Now if the air volumes on both sides of the U-tube are equal, then these changes in pressures will be fully compensated in their effect on the position of the indicating liquid in the U-tube.

The fixture 18 may be provided with a flange 47 which is attached to a ring 49 on top of tank with screws 50.

The U-tube may contain liquid 10 up to certain mark on the scale, so that for installation it is necessary to place the corresponding amount of liquid in tank before the pipes 13 and 14 are connected. The indicator may be made, however, to contain liquid up to zero point on the scale by providing sufficient space for this liquid below zero point. In that case the installation may be made with an empty tank.

Important advantages of my indicator are that it can be used for any sizes and capacities of tanks, that it is not affected by temperature and pressure variations, can indicate at any point away from the tank, and can be used for liquids with different specific gravities.

I claim as my invention:

In a liquid level indicator, the combination with an indicating device comprising two chambers, means to indicate difference of air pressure between said chambers, a tank, a fixture member in said tank, means to attach said member to the top cover of said tank, said member being provided with depressions on its opposite sides, corrugated flexible plates covering said depressions, said depressions with said plates forming closed chambers, said member being provided with separate tubular apertures extending from its top to said second mentioned chambers, a pipe extending from one of said chambers to one chamber of said indicating device, a second pipe extending from the other aperture to the second chamber of said indicating device, rods attached to the centers of said flexible plates, means to draw said rods together, a cam between said rods, means to rotatively support said cam, a rod attached to said cam, and a float on the end of said rod.

VICTOR P. CLEAR.